(12) United States Patent
Machunze et al.

(10) Patent No.: US 11,358,704 B2
(45) Date of Patent: Jun. 14, 2022

(54) NOISE REDUCED END RIB ASSEMBLY FOR A HIGH-LIFT DEVICE OF AN AIRCRAFT

(71) Applicant: Airbus Defence and Space GmbH, Taufkirchen (DE)

(72) Inventors: Wolfgang Machunze, Taufkirchen (DE); Heiko Fietzek, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 168 days.

(21) Appl. No.: 16/552,373

(22) Filed: Aug. 27, 2019

(65) Prior Publication Data

US 2020/0070951 A1    Mar. 5, 2020

(30) Foreign Application Priority Data

Sep. 3, 2018    (DE) .................. 10 2018 121 395.6

(51) Int. Cl.
*B64C 3/18* (2006.01)
*B64C 9/16* (2006.01)
*B64C 9/18* (2006.01)

(52) U.S. Cl.
CPC ............... *B64C 3/187* (2013.01); *B64C 9/16* (2013.01); *B64C 9/18* (2013.01)

(58) Field of Classification Search
CPC .... B64C 9/16; B64C 9/18; B64C 9/20; B64C 3/187; B64C 21/02; B64C 2230/14; B64C 2230/20; B64C 2230/24
See application file for complete search history.

(56) References Cited

U.S. PATENT DOCUMENTS

| 3,974,986 A | 8/1976 | Johnstone |
| 4,117,996 A | 10/1978 | Sherman |
| 6,491,260 B2 | 12/2002 | Borchers et al. |
| 8,096,513 B2 | 1/2012 | Mau et al. |

(Continued)

FOREIGN PATENT DOCUMENTS

| DE | 10 2006 008 434 A1 | 9/2007 |
| DE | 10 2016 123 096 A1 | 5/2018 |

(Continued)

OTHER PUBLICATIONS

British Search Report for Application No. 1912556.6 dated May 7, 2020.

(Continued)

*Primary Examiner* — Philip J Bonzell
*Assistant Examiner* — Ashesh Dangol
(74) *Attorney, Agent, or Firm* — Jenkins, Wilson, Taylor & Hunt, P.A.

(57) ABSTRACT

An end rib assembly for a high-lift device of an aircraft to reduce the noise caused by the transition between the wing and a high-lift device as well as the noise caused by the lateral side edge of the end rib assembly. An end rib assembly includes a noise-reducing portion configured to reduce noise caused by an airflow around the end rib assembly, and a guiding portion configured for guiding the end rib assembly along a pre-determined path when the high-lift device is moved between a retracted position and an extended position, wherein the guiding portion is formed such that an airflow impinging on the guiding portion is partly guided towards the noise-reducing portion.

18 Claims, 15 Drawing Sheets

(56) References Cited

U.S. PATENT DOCUMENTS

| | | | |
|---|---|---|---|
| 9,132,909 B1 * | 9/2015 | Khorrami | B64C 21/10 |
| 9,199,721 B2 * | 12/2015 | Cook | B64C 7/00 |
| 9,302,761 B2 * | 4/2016 | Isotani | B64C 3/58 |
| 2002/0066831 A1 | 6/2002 | Ngo et al. | |
| 2015/0083855 A1 * | 3/2015 | Moser | B64C 9/16 |
| | | | 244/1 N |
| 2015/0259060 A1 | 9/2015 | Khorrami | |
| 2018/0148163 A1 | 5/2018 | Bauer et al. | |

FOREIGN PATENT DOCUMENTS

| | | |
|---|---|---|
| EP | 1 149 761 A1 | 10/2001 |
| EP | 2 455 282 A1 | 5/2012 |
| EP | 2 746 152 A2 | 6/2014 |
| EP | 2 832 638 A1 | 2/2015 |
| WO | WO 2007/095931 A2 | 8/2007 |

OTHER PUBLICATIONS

German Office Action for Application No. 10 2018 121 395.6 dated May 24, 2019.

\* cited by examiner

NOISE REDUCED END RIB ASSEMBLY FOR A HIGH-LIFT DEVICE OF AN AIRCRAFT

CROSS-REFERENCE TO RELATED APPLICATION

This application claims priority to German Patent Application DE 10 2018 121 395.6 filed Sep. 3, 2018, the entire disclosure of which is incorporated by reference herein.

TECHNICAL FIELD

The disclosure herein relates to an end rib assembly for a high-lift device. Furthermore, the disclosure herein relates to a high-lift device and an attachment arrangement.

BACKGROUND

DE 10 2016 123 096 A1 discloses a control surface part for reducing noise caused by airflow surrounding the control surface.

During descent or approach of an airport various noise sources are active on an aircraft. The most common sources include the extended landing gear, the gap between slats, high-lift devices and/or the wing as well as the side-edge portions of the high-lift devices. The time an aircraft is able to land at a particular airport is influenced by the noise emitted by the aircraft. Furthermore, additional fees for approach and landing may be levied depending on the noise emissions.

Due to their nature end ribs pose a challenge in noise reduction. In particular, high acoustic frequencies are usually responsible that noise is felt as very unpleasant.

SUMMARY

It is an object of the disclosure herein to improve end rib assemblies for high-lift devices, in particular in regards to noise emissions.

The object is achieved using features disclosed herein.

The disclosure herein provides an end rib assembly for a high-lift device of an aircraft, the high-lift device being movably attachable to a wing of the aircraft, the end rib assembly being configured for reducing the noise caused by a side edge of the high-lift device and by a gap between the wing and the high-lift device, the end rib assembly comprising a noise-reducing portion configured to reduce noise caused by an airflow around the end rib assembly, a guiding portion configured for guiding the end rib assembly along a predetermined path, when the high-lift device is moved between a retracted position and an extended position, wherein the guiding portion is formed in such a way that an airflow impinging on the guiding portion is partly guided towards the noise-reducing portion.

It is preferred that the guiding portion is shaped at its leading edge such that the guiding portion is inclined towards the trailing edge, so as to partly guide the airflow towards the noise-reducing portion.

It is preferred that the guiding portion is shaped at its leading edge such that the guiding portion is inclined towards the trailing edge in such a way that the inclination smoothly and continuously transitions into the lateral edge, so as to partly guide the airflow towards the noise-reducing portion.

It is preferred that the guiding portion comprises a receiving opening configured for receiving a wing longitudinal protrusion, the receiving opening arranged at the leading-edge side of the end rib assembly.

It is preferred that the receiving opening is configured, in particular shaped, in such a way that the wing longitudinal protrusion is received regardless of a deflection of the end rib assembly in the vertical direction.

It is preferred that the guiding portion comprises a guiding channel extending towards the trailing edge and being fluidly connected to the outside of the end rib assembly via an inlet opening, in particular via the receiving opening.

It is preferred that the guiding channel is configured to fluidly connect to the noise-reducing portion, so as to allow airflow taken in by inlet opening to flow to the noise-reducing portion.

It is preferred that the guiding portion comprises an outlet opening engaging the noise-reducing portion, so as to output the airflow into the noise-reducing portion.

It is preferred that the guiding portion comprises a bearing arrangement for supporting the wing longitudinal protrusion, wherein the bearing arrangement is arranged within the guiding channel.

It is preferred that the bearing arrangement comprises at least one bearing member, wherein the bearing member is selected from a group of bearing members consisting of roller bearing members and sliding bearing members.

It is preferred that the guiding portion comprises an end rib longitudinal protrusion extending in the lateral direction outward, the longitudinal protrusion being configured to be received in a wing receiving opening.

It is preferred that the end rib assembly has a mounting portion configured for mounting the end rib assembly to a high-lift device.

It is preferred that the noise-reducing portion has a noise-reducing member.

It is preferred that the noise-reducing member is attached to the mounting portion.

It is preferred that the noise-reducing member includes a metal-foam.

The disclosure herein provides a high-lift device, in particular flap, for an aircraft comprising a high-lift body configured to generate lift and comprising a preferred end rib assembly, wherein the end rib assembly is fixedly mounted to the high-lift body at a side edge.

It is preferred that the high-lift device is the laterally outermost high-lift device.

The disclosure herein provides an attachment arrangement for attaching a high-lift device to an aircraft wing of an aircraft comprising a preferred end rib assembly and/or a preferred high-lift device and comprising an attaching assembly, wherein the high-lift device is movably attached to the aircraft wing, wherein the movement between the extended position and the retracted position is controlled by cooperation of the end rib assembly and the attaching assembly, wherein the attaching assembly is matched to the end rib assembly.

It is preferred that the attaching assembly comprises a wing longitudinal protrusion configured for being received by the guiding portion and/or that the attaching assembly comprises a wing guiding channel configured for receiving an end rib longitudinal protrusion.

Preferably, the attachment arrangement comprises a noise-reducing section having a noise-reducing material, wherein the noise-reducing section is mountable to the bottom side of an aircraft wing, so as to absorb noise emanating from the end rib assembly in the upward direction.

The disclosure herein further provides an aircraft wing, having a preferred end rib assembly and/or high-lift device and/or attachment arrangement.

It is preferred that the noise-reducing section is mounted to the bottom side of an aircraft wing, so as to absorb noise emanating from the end rib assembly in the upward direction.

It is preferred that the aircraft wing comprises an accommodating recess, in which the high-lift device is accommodated in the retracted position, wherein the noise-reducing section is arranged within the accommodating recess.

The disclosure herein also provides an aircraft comprising a preferred end rib assembly, high-lift device, attachment arrangement and/or aircraft wing, so as to absorb noise emanating from the end rib assembly when the high-lift device is not in the retracted position.

During descent usually the extended landing gears, slat gaps and end ribs of extended flaps, in particular the outermost flap, are responsible for the generation of noise. The disclosure herein focuses onto the end ribs.

The challenge is to provide a low-noise interface between wing and high-lift device, such as a flap, since in the retracted position the wing curvature is transmitted onto the high-lift device by rollers or a so-called unicorn. Thus, an aerodynamically optimal design of the wing is possible. In the extended position this transition between wing and high-lift device and further design features are usually thought to be responsible for noise generation.

Regulatory rules and sometimes fees are enforced based on the generated noise during descent. Thus, when applying the present ideas, cost reduction and landings at a later time, e.g. caused by delays, are possible. Furthermore, the disclosure herein may be used with aircraft independently of whether the aircraft has a fixed trailing edge (sometimes called a spike).

Measurements by the applicant investigated the flap side edge and revealed the mechanisms for noise generation.

For example, the high-lift device may have a so called "fish mouth"-interface in which a roller, mounted to the wing is inserted. Sometimes the rollers may be arranged on the end rib of the flap and the fish mouth is mounted to the wing. Both concepts cause noise. In addition, both these interface structures possess cavities and sharp edges that may generate further noise.

It is known to utilize a so-called unicorn at the interface between the laterally inner (inboard) flap and the laterally outer (outboard) flap near the kink portion. The unicorn is basically a longitudinal protrusion or cam to force the curvature of the wing upon the flap. The unicorn is mounted to the flap.

It is also possible to invert the arrangement and mount the unicorn to the wing—a so-called inverted unicorn. This arrangement usually performs better in regards to noise reduction compared to the non-inverted one. The flap comprises a catcher at the end rib of the outermost flap. The catcher may be integrated into the rib.

Avoiding structures that extend from the loft and providing a noise-reducing open-pored metal-foam allows for an end rib assembly which can improve critical aspects such as noise generation and clearance.

Economically there is the potential for the reduction of fees depending on the noise level caused by the aircraft during descent. Furthermore, the present idea allows alone or in particular in connection with the other noise sources (landing gears, slat gaps) a later landing time. Thus, the operation time of the aircraft may be increased.

The goal of the present idea is an end rib having as low noise generation as possible and fulfilling the requirements regarding:

wing curvature→interface; and
clearance→heat extension.

The (inverted) unicorn may provide an interface between itself and the flap via a sliding bearing or a roller bearing. Both ideas may include the same catching surfaces, since different curvatures of wing and flap are included into the shape of the unicorn and/or the opening of the end rib. While the roller solution might have a larger footprint and may be technically more complex, the decrease in friction improves the usability of the end rib on larger high-lift devices for larger aircraft. A further aspect may be that the metal-foam is not only included into the end rib, but directly adjacent, and in particular fluidly connected, to the opening for the unicorn.

The foam may serve two purposes: on the one hand, noise generated by the opening is absorbed, since the waves emerge within the opening; on the other hand, the noise generation of the end rib caused by the lateral surface may be reduced.

The opening in the end rib at the flap may include a cover device configured for covering the opening in the extended position of the flap. Since in the extended position the unicorn is usually not accommodated within the opening, the cover device may cover the opening in its entirety, thereby removing a source for noise. As a result, the end rib is even more low noise.

Moreover, if the opening is not covered, a noise absorbing material may be arranged below the spike. The noise generated by the opening initially is radiated upwards and subsequently absorbed by the noise absorbing material, which can also be configured as a metal-foam.

BRIEF DESCRIPTION OF THE DRAWINGS

The disclosure herein is disclosed making reference to the enclosed drawings. Therein.

DETAILED DESCRIPTION

Figure 1:
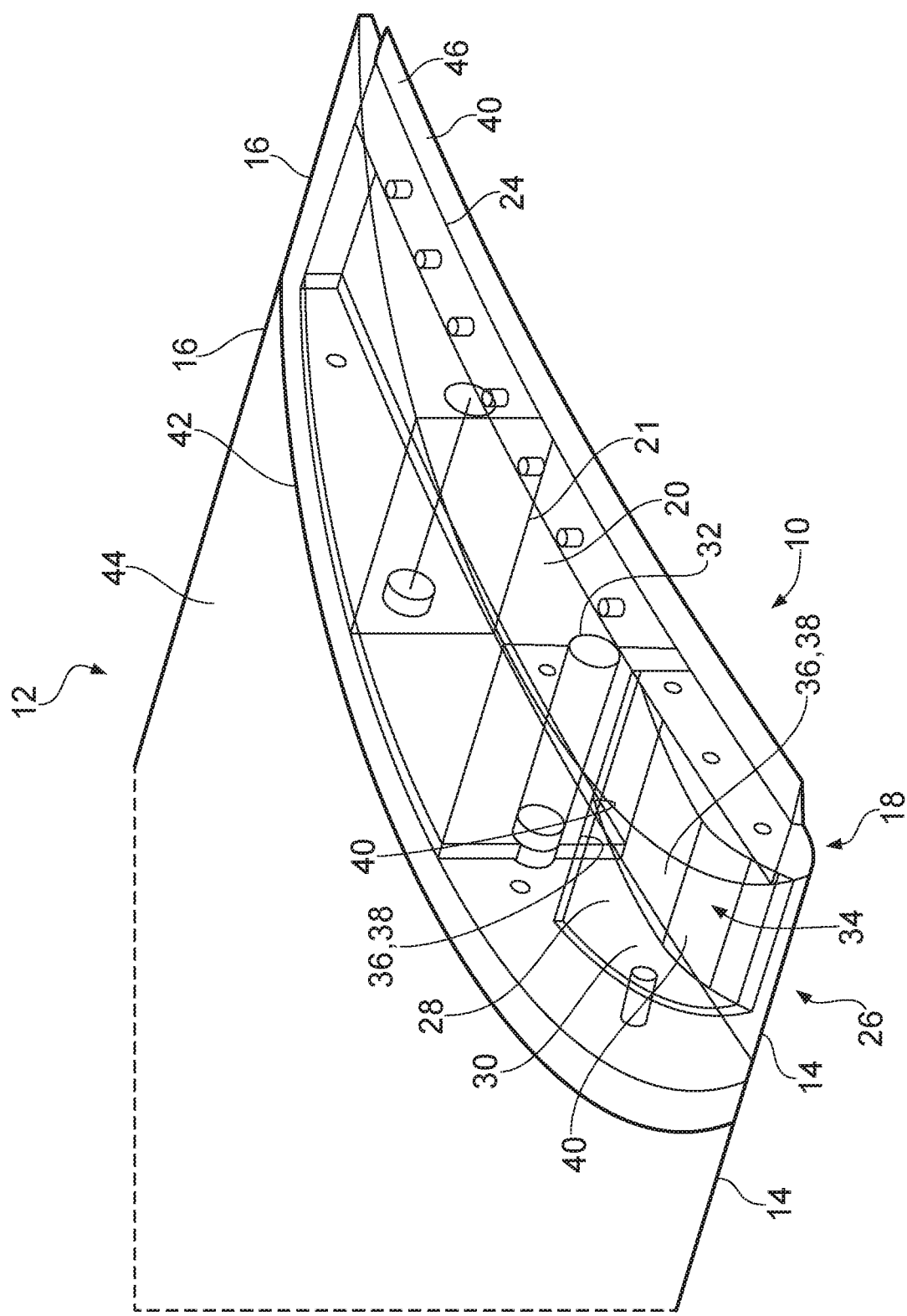
FIG. 1 depicts an end rib assembly.
Figure 2:
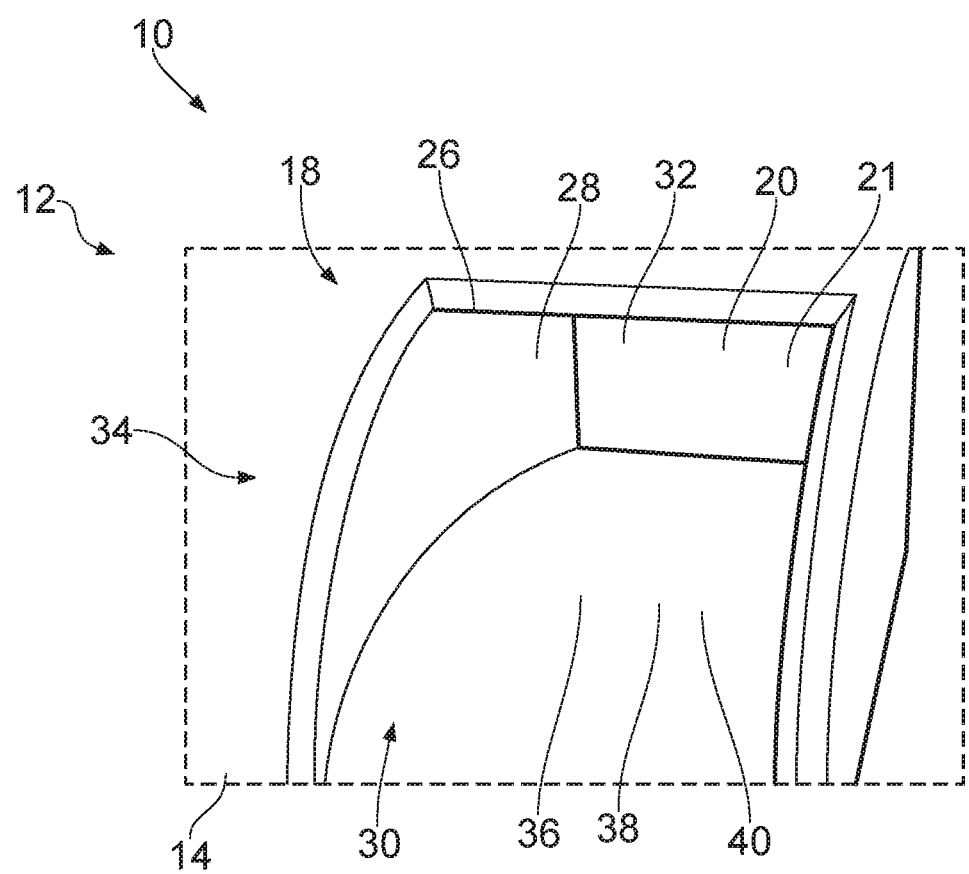
FIG. 2 illustrates a view onto the leading edge of the end rib assembly of FIG. 1.
Figure 3:
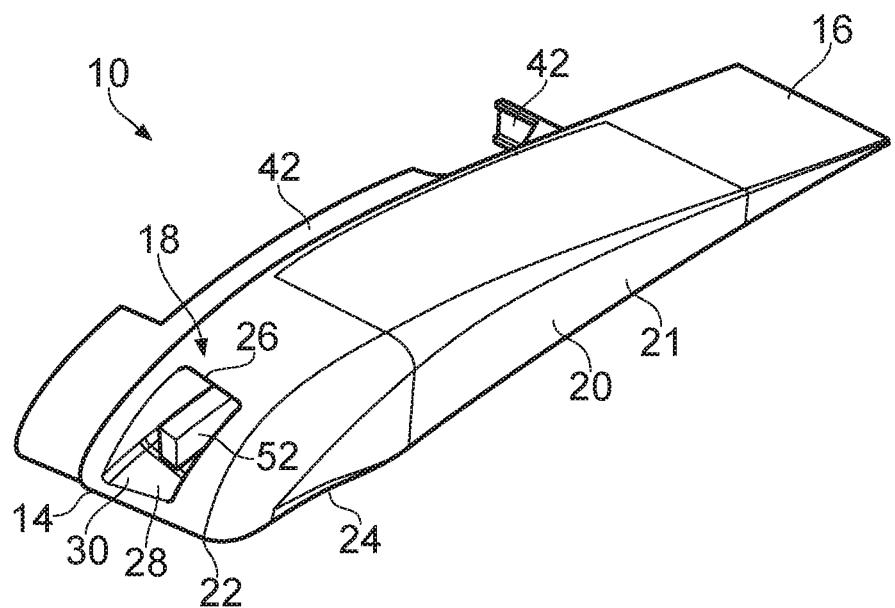
FIG. 3 through FIG. 6 illustrate an end rib assembly.
Figure 4:
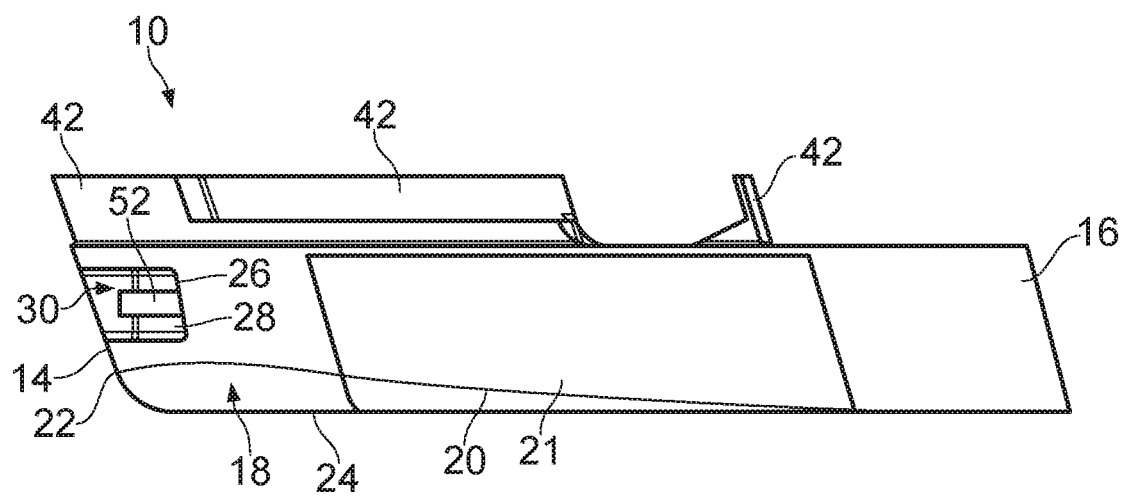
Figure 5:
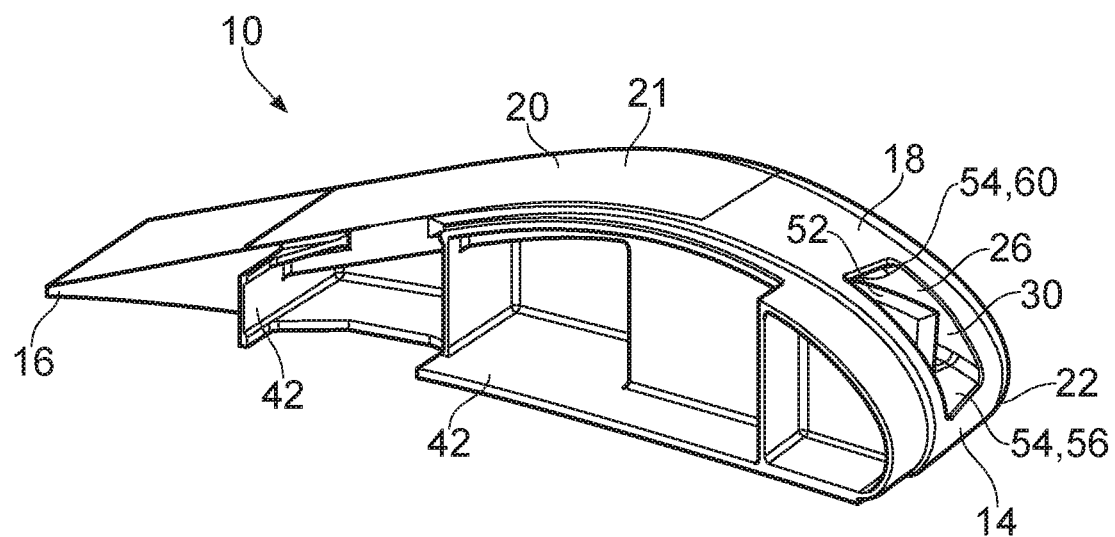
Figure 6:
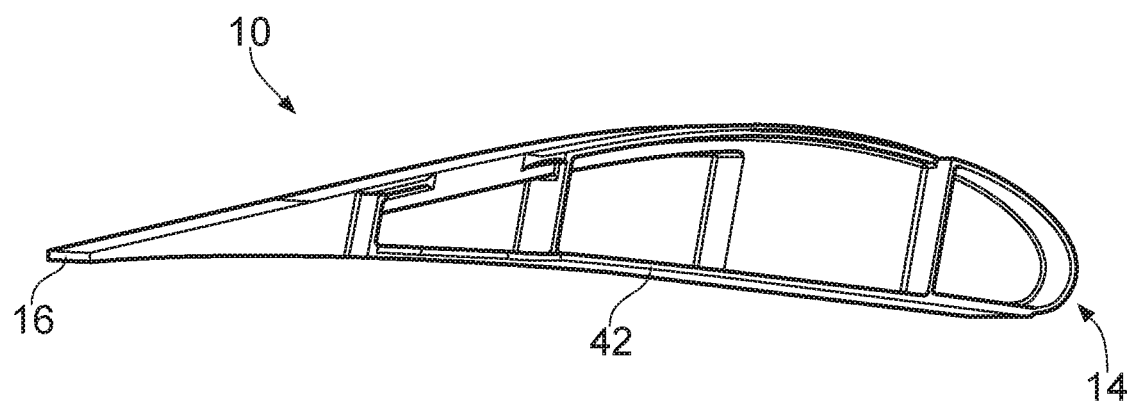

Referring to FIGS. 1 through 6, an end rib assembly 10 is described. The end rib assembly 10 is fixedly mounted to a high-lift device 12. The end rib assembly 10 comprises a leading edge 14 and a trailing edge 16.

The end rib assembly 10 comprises a guiding portion 18. The guiding portion extends from the leading edge 14 towards the trailing edge 16.

Furthermore, the end rib assembly 10 comprises a noise-reducing portion 20. The noise-reducing portion 20 is configured to reduce the noise generated by the end rib assembly 10. The noise-reducing portion 20 is disposed adjacent to the guiding portion 18. The noise-reducing portion 20 extends from the guiding portion 18 towards the trailing edge 16. Preferably the noise-reducing portion 20 extends all the way from the guiding portion 18 to the trailing edge 16. The noise-reducing portion 20 may include a noise-reducing member 21, which is preferably made of a metal-foam.

The guiding portion 18 is shaped in such a way that an airflow impinging on the leading edge 14 is guided towards the noise-reducing portion 20.

When viewed from above, the leading edge 14 of the guiding portion 18 is inclined with respect to the lateral direction towards the trailing edge 16. In other words, a leading edge 14 of the guiding portion 18 continuously moves towards the trailing edge 16 of the guiding portion 18 compared to the leading edge 14 of the high-lift device 12. When viewed from above, the leading edge 14, starting from a first point 22 continuously increases the inclination and subsequently transitions into a lateral side edge 24 of the end rib assembly 10.

The guiding portion 18 includes a receiving opening 26. The receiving opening 26 is configured to receive a wing longitudinal protrusion (described later). Preferably, the receiving opening 26 is arranged at the leading-edge side of the end rib assembly 10.

The end rib assembly 10 further comprises a guiding channel 28. The guiding channel 28 extends the towards the trailing edge side 16 of the end rib assembly 10. The guiding channel 28 is fluidly connected to an inlet opening 30. The inlet opening 30 may be formed by the receiving opening 26.

Preferably, the guiding channel 28 also comprises an outlet opening 32. The outlet opening 32 is preferably arranged on the trailing edge side of the guiding channel 28. In particular, the outlet opening 32 is directly adjacent to the noise-reducing portion 20.

The guiding channel 28 is configured to allow an airflow impinging a leading edge 14 to flow towards the noise-reducing portion 20. The airflow enters the guiding channel 28 via the inlet opening 30 and leaves the guiding channel 28 via outlet opening 32.

The end rib assembly 10 comprises a bearing arrangement 34. In this example, the bearing arrangement 34 comprises a plurality of bearing members 36. The bearing members 36 are formed as sliding bearing members 38, preferably by sliding bearing surfaces 40. The bearing members 36 are preferably arranged at the top and the bottom of the guiding channel 28. The bearing members 36 are configured for a sliding contact with a wing longitudinal protrusion.

The end rib assembly 10 comprises a mounting portion 42. The mounting portion 42 is configured to mount the end rib assembly 10 to the high-lift device 12 in particular a high-lift body 44 of the high-lift device 12.

The end rib assembly 10 comprises a sealing portion 46. The sealing portion 46 is arranged at the bottom of the end rib assembly 10. The sealing portion 46 may include a single sealing strip 48, which is preferably made of rubber or a similar material. The sealing portion 46 is configured to seal a gap between the end rib assembly 10 and an aircraft wing in which the end rib assembly 10 may be accommodated in its retracted position.

The end rib assembly 10 is fixedly mounted to the high-lift device 12, in particular the high-lift body 44. The high-lift device 12 is movably attached to an aircraft wing 50.

The aircraft wing 50 comprises a wing longitudinal protrusion 52, which extends towards the trailing edge side of the aircraft wing 50, preferably towards the end rib assembly 10. The wing longitudinal protrusion 52 is also referred to as a unicorn.

Figure 7:
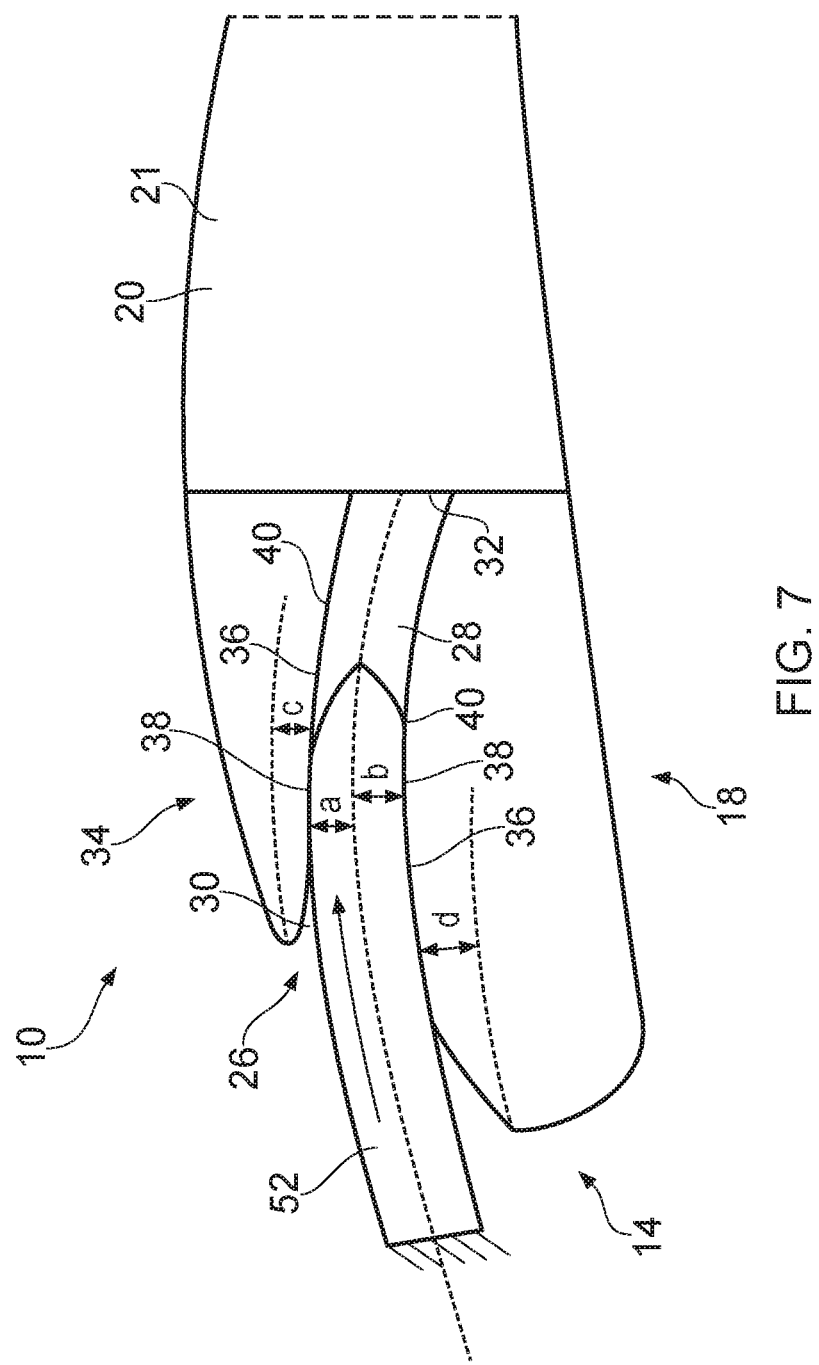
FIG. 7 through FIG. 9 illustrate the end rib assembly and a unicorn.

As in particular depicted in FIG. 7, the wing longitudinal protrusion 52 engages the guiding portion 18. The wing longitudinal protrusion 52 is accommodated within the guiding channel 28 and slidingly supported by the bearing arrangement 34. The wing longitudinal protrusion 52 functions as a cam for the end rib assembly 10. Thus, the wing longitudinal protrusion 52 in cooperation with the guiding portion 18 ensures that the end rib assembly 10 moves along a predetermined movement path between the retracted position and the extended position of the end rib assembly 10. The end rib assembly 10 thus may follow substantially the curvature of the aircraft wing 50, allowing for a smooth transition of the airflow.

It should be noted, that in the extended position of the end rib assembly 10, the wing longitudinal protrusion 52 is preferably not accommodated within the guiding channel 28. It is preferred that the wing longitudinal protrusion 52 does not engage the guiding portion 18, when the end rib assembly 10 is in the extended position.

Figure 8:
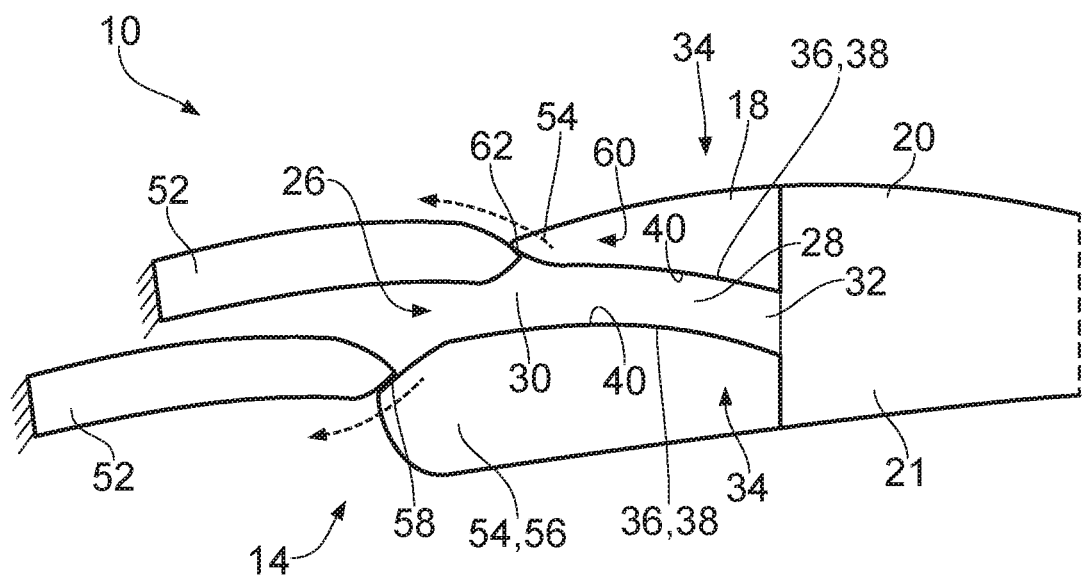

As may be gathered from FIG. 8, the receiving opening 26 is configured to receive the wing longitudinal protrusion 52. The receiving opening 26 may comprise a plurality of catching portions 54. A lower catching portion 56 is arranged at the bottom of the receiving opening 26. The lower catching portion 56 may include an inclined catching surface 58 which engages the wing longitudinal protrusion 52, when the end rib assembly 10 is deflected upwards, for example by vibrations, and guides the wing longitudinal protrusion 52 into the guiding channel 28.

An upper catching portion 60 is arranged at the top of the receiving opening 26. Similarly, to the lower catching portion 56, the upper catching portion 60 may include an inclined catching surface 62. The inclined catching surface 62 is configured in such a way that, when the end rib assembly 10 is deflected downwards, the wing longitudinal protrusion 52 engages the upper catching portion 60 and is guided into the guiding channel 28.

Figure 9:
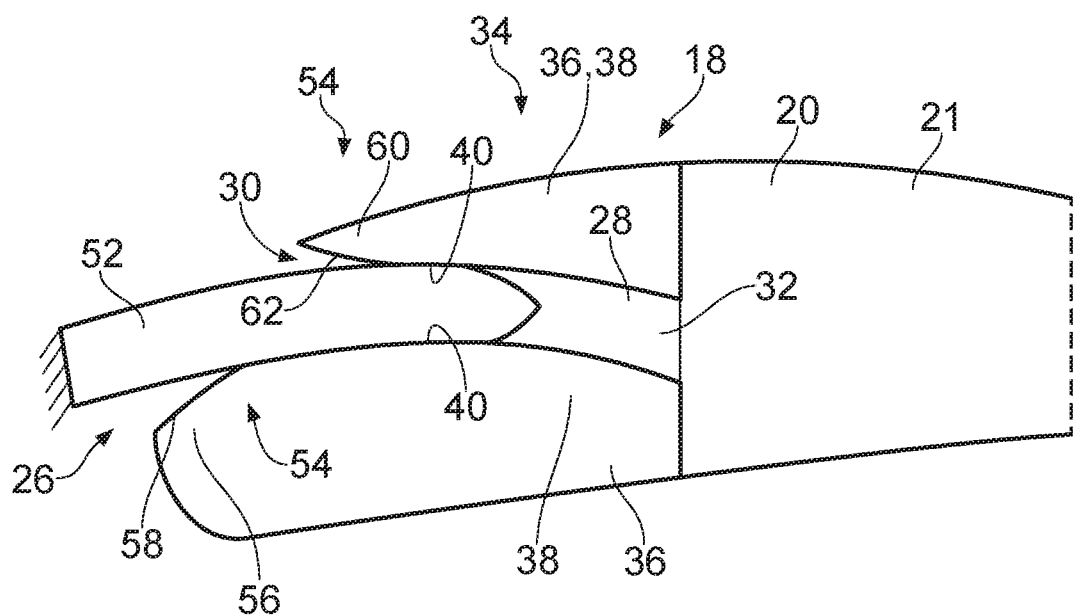

As a result, as depicted in FIG. 9, the wing longitudinal protrusion 52 is reliably inserted into the guiding channel 28 regardless of the deflection of the end rib assembly 10.

Figure 10:
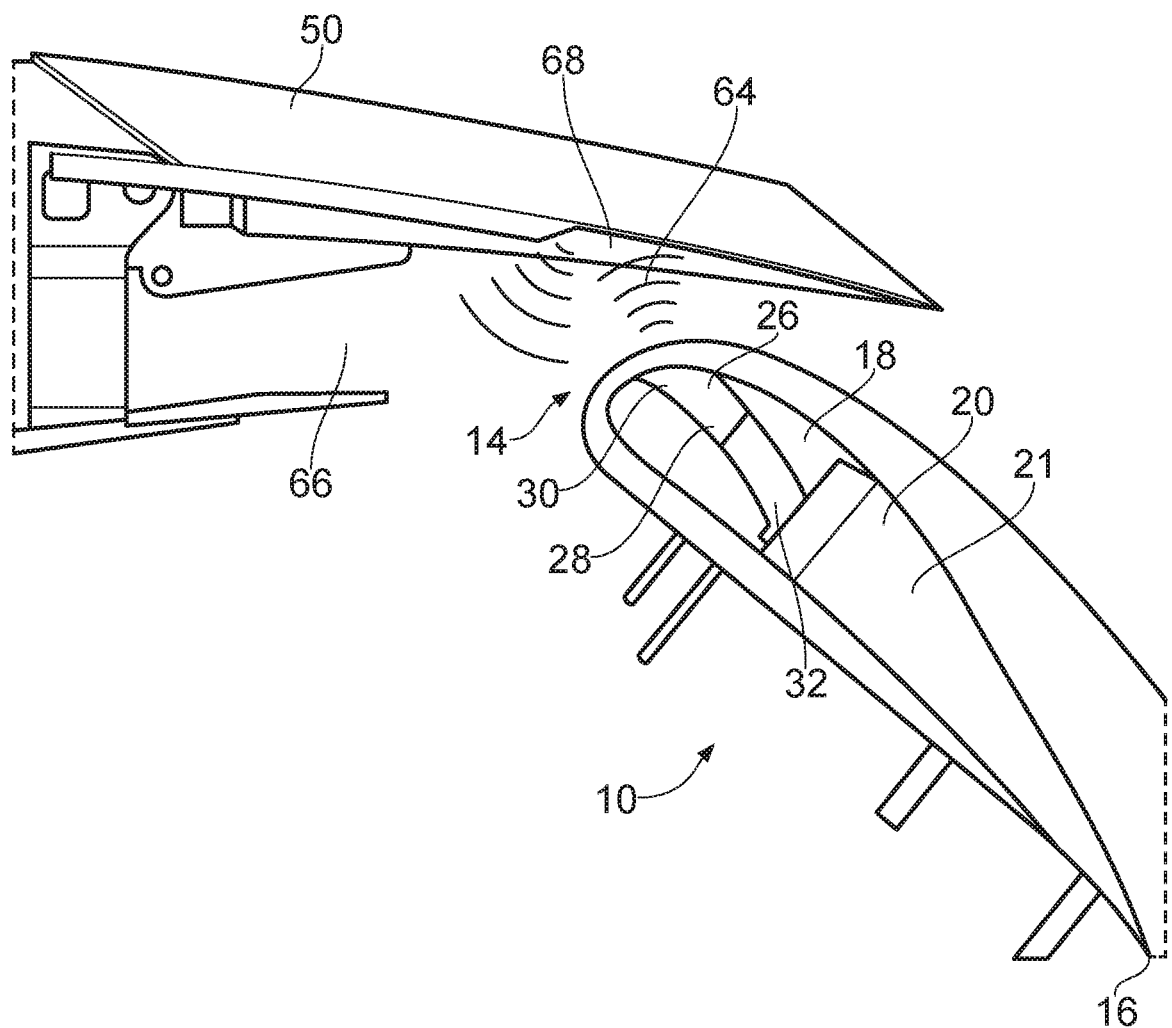
FIG. 10 illustrates noise propagation.
Figure 11:
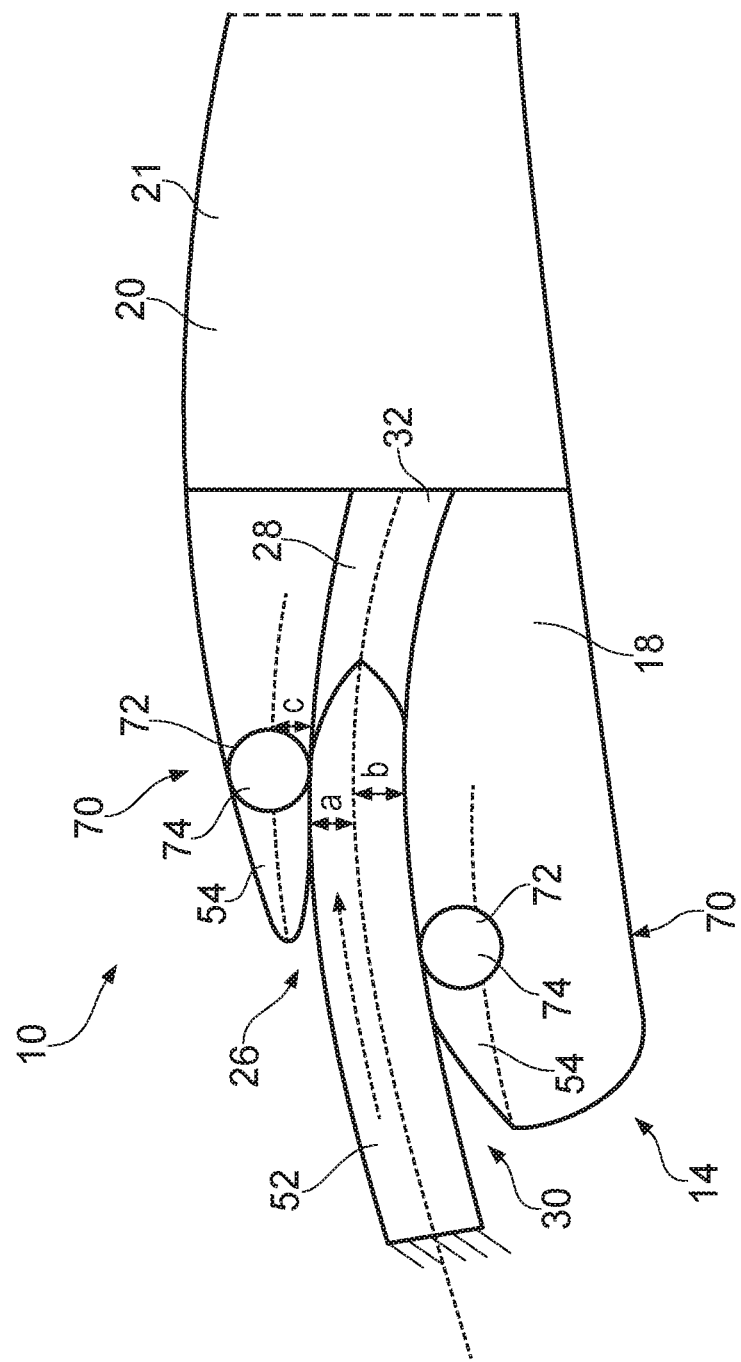
FIG. 11 through FIG. 16 illustrate an end rib assembly with rollers.
Figure 12:
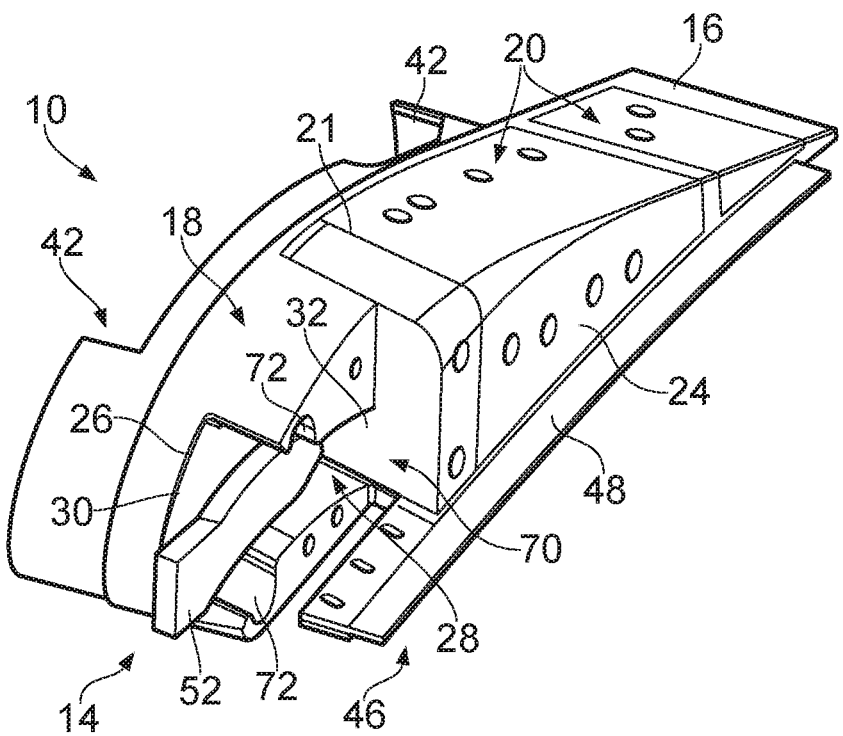
Figure 13:
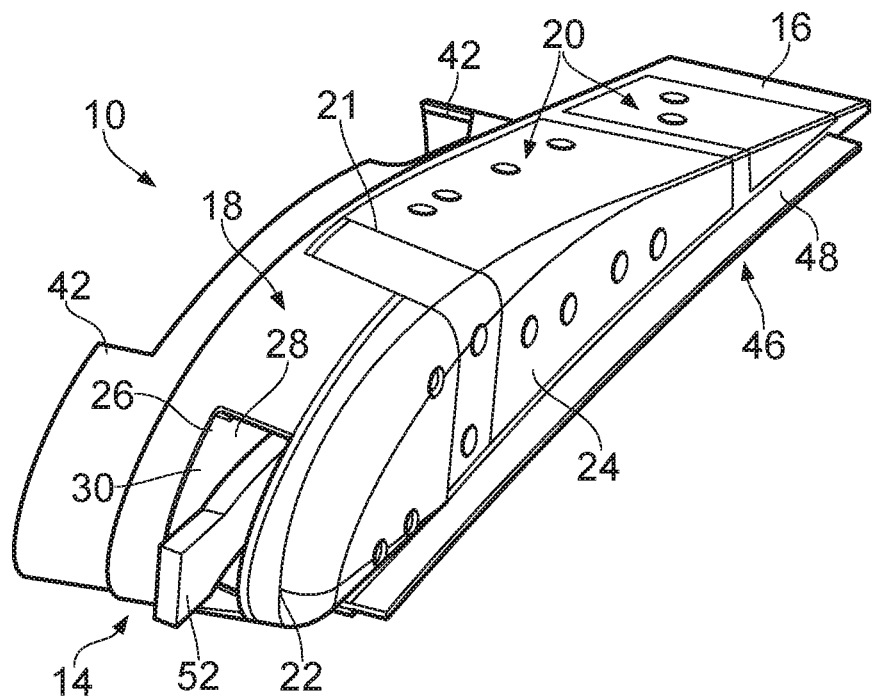
Figure 14:
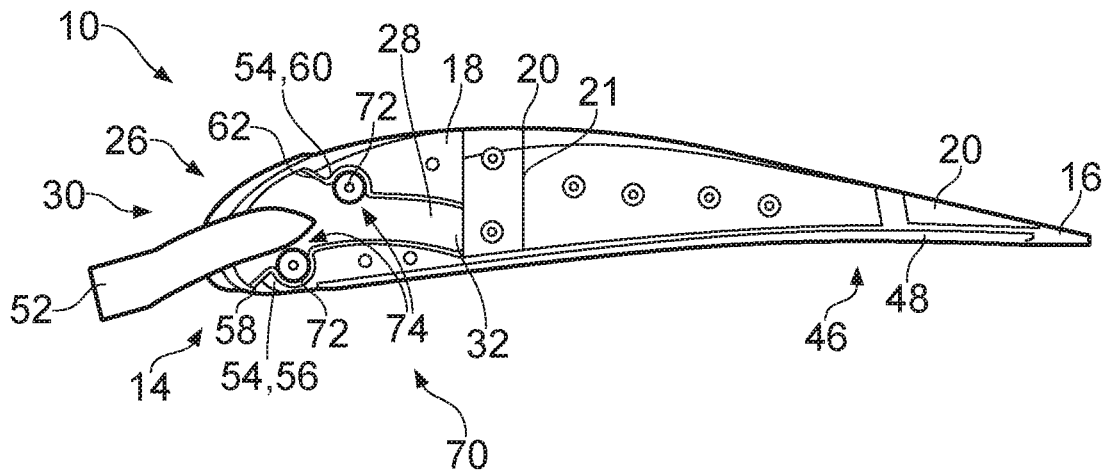
Figure 15:
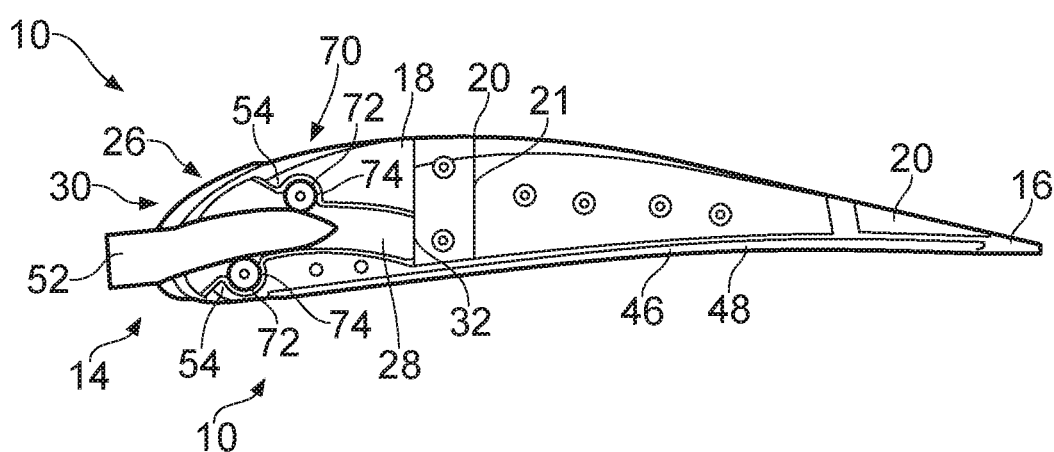
Figure 16:
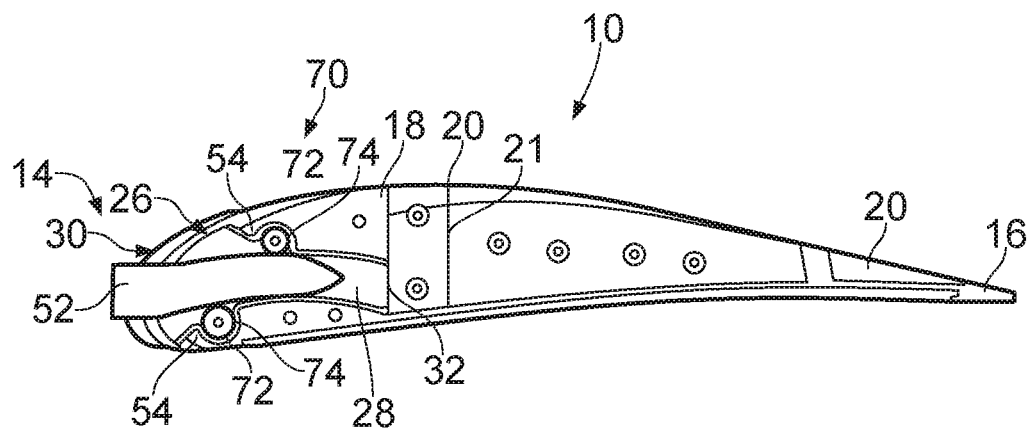
Figure 17:
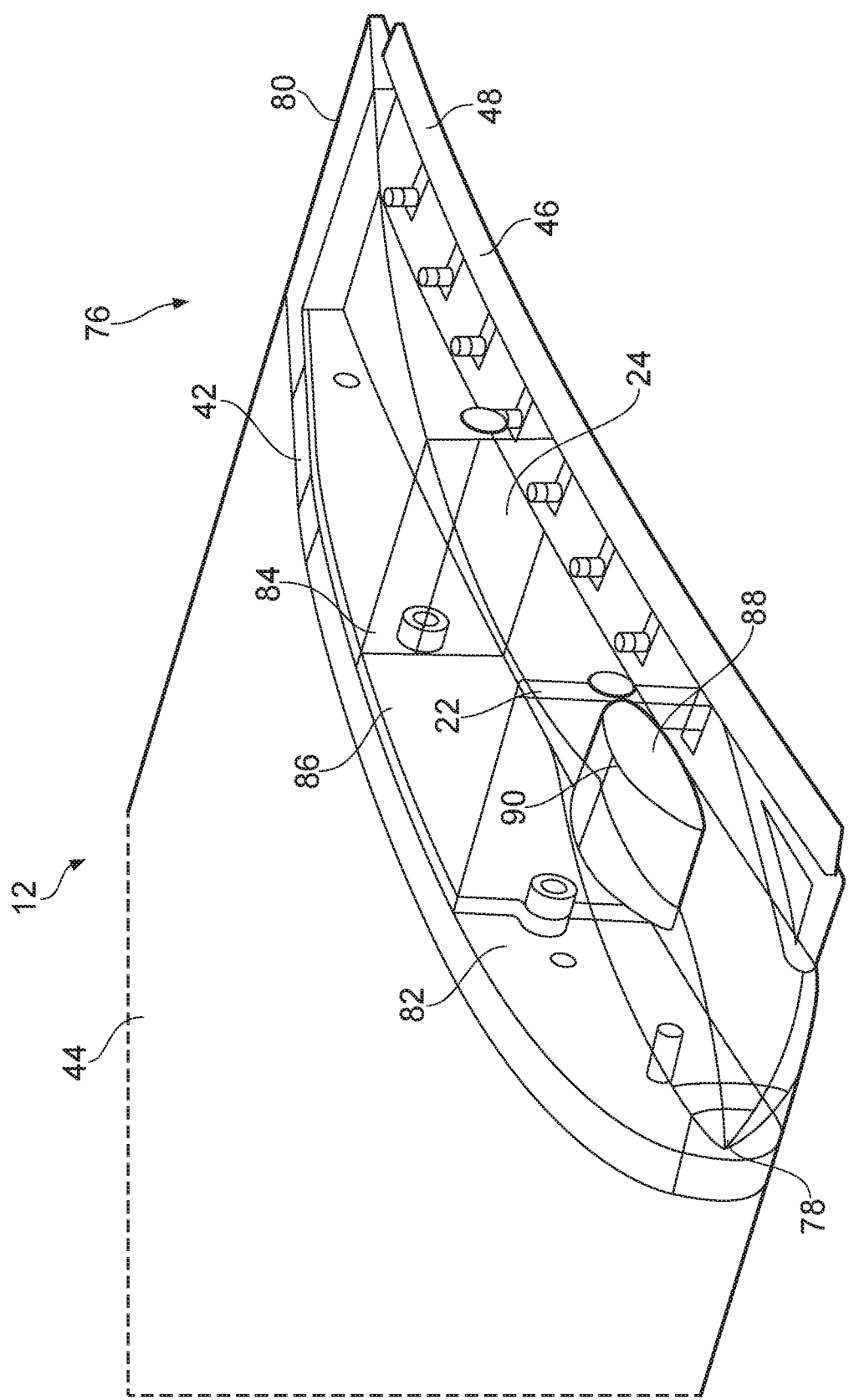
FIG. 17 through FIG. 21 illustrate an end rib assembly having a lateral unicorn.
Figure 18:
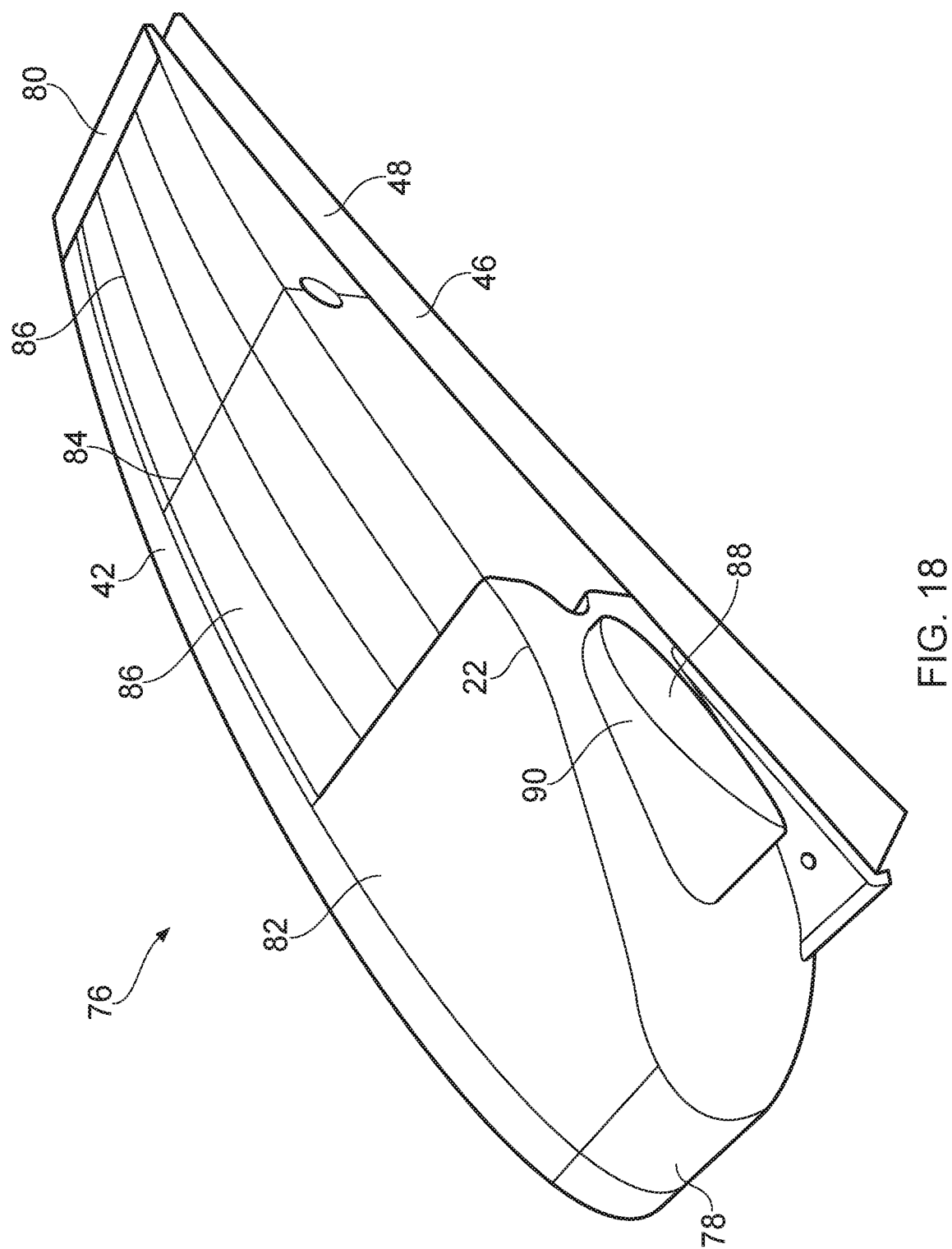

Reference is made to FIG. 10 which illustrates schematically a propagation of sound waves 64. The aircraft wing 50 comprises a receiving section 66 in which the end rib assembly 10 and preferably the high-lift device 12 are arranged, when the end rib assembly 10 is in its retracted state. At a surface of the receiving section 66, preferably a noise-reducing section 68 is provided. The noise-reducing section 68 may include a metal-foam or other noise-reducing material. The noise-reducing section 68 is arranged on the aircraft wing 50 within the receiving section 66 in such a way that the sound wave 64 generated by the guiding portion 18 of the end rib assembly 10 are reduced in their strength or entirely absorbed.

Reference is made to FIGS. 11 through 16, which schematically depict a bearing arrangement 70. The bearing arrangement 70 includes a plurality of bearing members 72. The bearing members 72 are configured as roller-bearing members 74. The bearing members 72 are respectively arranged adjacent to the catching portions 54. Thus, the wing longitudinal protrusion 52 is initially supported in a sliding manner and subsequently supported by the bearing members 72. While the bearing arrangement 70 may have a larger footprint, it improves the utilization of the end rib assembly 10 for larger and heavier high-lift devices 12.

Reference is made to FIGS. 17 through 21 which illustrate another embodiment of an end rib assembly 76. The end rib assembly 76 comprises a leading edge 78 and a trailing edge 80. The end rib assembly 76 further comprises a guiding portion 82 which extends starting from the leading edge 78 towards the trailing edge 80.

Adjacent to the guiding portion 82 there is provided a noise-reducing portion 84. The noise-reducing portion 84 includes a metal-foam 86. The noise-reducing portion 84 starts adjacent to the guiding portion 82 and extends towards the trailing edge 80, preferably all the way to the trailing edge 80.

The guiding portion 82 includes an end rib longitudinal protrusion 88. The end rib longitudinal protrusion 88 extends in the lateral direction outward. The end rib longitudinal protrusion 88 is also referred to as a lateral unicorn.

It should be noted that the end rib longitudinal protrusion 88 does not extend beyond the guiding portion 18, and in particular beyond the leading edge 14. The end rib longitudinal protrusion 88 roughly has a teardrop-shape beginning towards the leading-edge side and increasing in thickness towards the trailing edge until a second point 90. Subsequently, the end rib longitudinal protrusion 88 decreases again in thickness towards the trailing edge 80, but faster. In other words, the end rib longitudinal protrusion is asymmetric along the leading edge-trailing edge-direction.

Since the end rib assembly 76 comprises the end rib longitudinal protrusion 88, the aircraft wing 50 comprises a guiding section 92 configured for engaging the end rib longitudinal protrusion 88. The guiding section 92 includes a wing receiving opening 94 for receiving the end rib longitudinal protrusion 88 and a wing guiding channel 96 for guiding the end rib longitudinal protrusion 88.

Figure 19:
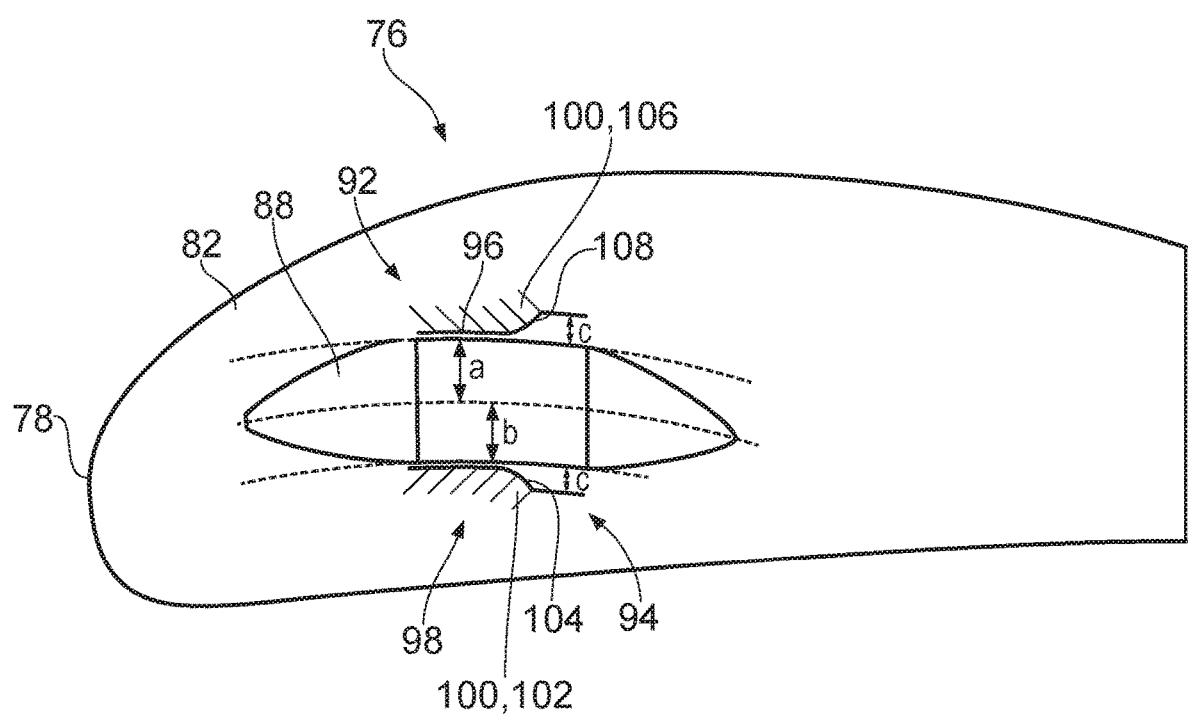

As in particular depicted in FIG. 19, the end rib longitudinal protrusion 88 engages the guiding section 92. The end rib longitudinal protrusion 88 is accommodated within the wing guiding channel 96 and slidingly supported by a bearing arrangement 98. The bearing arrangement 98 is depicted as a sliding bearing arrangement corresponding to the bearing arrangement 34, however the bearing arrangement 98 may also be configured as a roller-bearing arrangement corresponding to the bearing arrangement 70. The end rib longitudinal protrusion 88 functions as a cam for the end rib assembly 76. Thus, the end rib longitudinal protrusion 88 in cooperation with the guiding section 92 ensures that the end rib assembly 76 moves along a predetermined movement path between the retracted position and the extended position of the end rib assembly 76. The end rib assembly 76 thus may follow substantially the curvature of the aircraft wing 50, allowing for a smooth transition of the airflow.

It should be noted, that in the extended position of the end rib assembly 76, the end rib longitudinal protrusion 88 is preferably not accommodated within the wing guiding channel 96. It is preferred that the end rib longitudinal protrusion 88 does not engage the guiding section 92, when the end rib assembly 76 is in the extended position.

Figure 20:
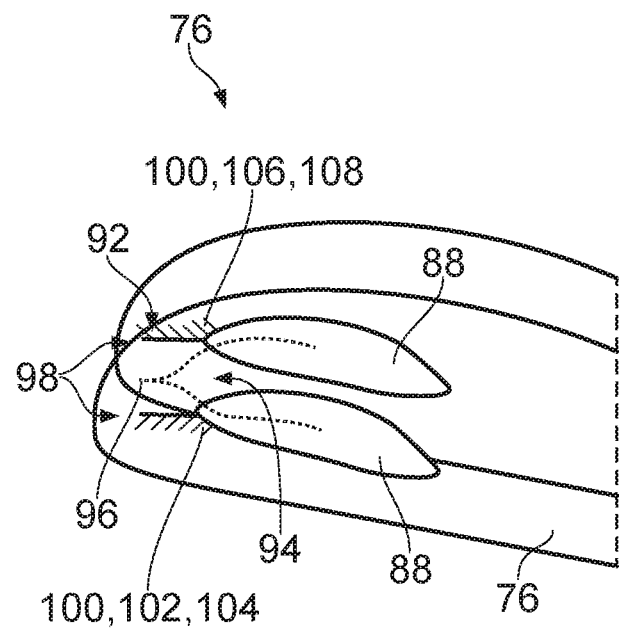

As may be gathered from FIG. 20, the wing receiving opening 94 is configured to receive the end rib longitudinal protrusion 88. The wing receiving opening 94 may comprise a plurality of wing catching portions 100. A lower catching portion 102 is arranged at the bottom of the wing receiving opening 94. The lower catching portion 102 may include an inclined catching surface 104 which engages the end rib longitudinal protrusion 88, when the end rib assembly 76 is deflected upwards, for example by vibrations, and guides the end rib longitudinal protrusion 88 into the wing guiding channel 96.

An upper catching portion 106 is arranged at the top of the wing receiving opening 94. Similarly, to the lower catching portion 102, the upper catching portion 106 may include an inclined catching surface 108. The inclined catching surface 108 is configured in such a way that, when the end rib assembly 76 is deflected downwards, the end rib longitudinal protrusion 88 engages the upper catching portion 106 and is guided into the wing guiding channel 96.

Figure 21:
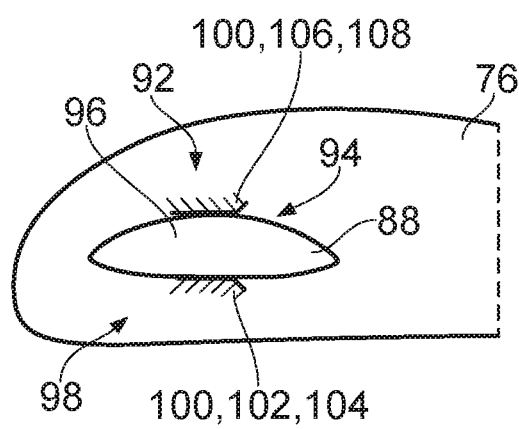

As a result, as depicted in FIG. 21, the end rib longitudinal protrusion 88 is reliably inserted into the wing guiding channel 96 regardless of the deflection of the end rib assembly 76.

If not otherwise described above, the end rib assembly 76 is substantially identical to the end rib assembly 10.

Figure 22:
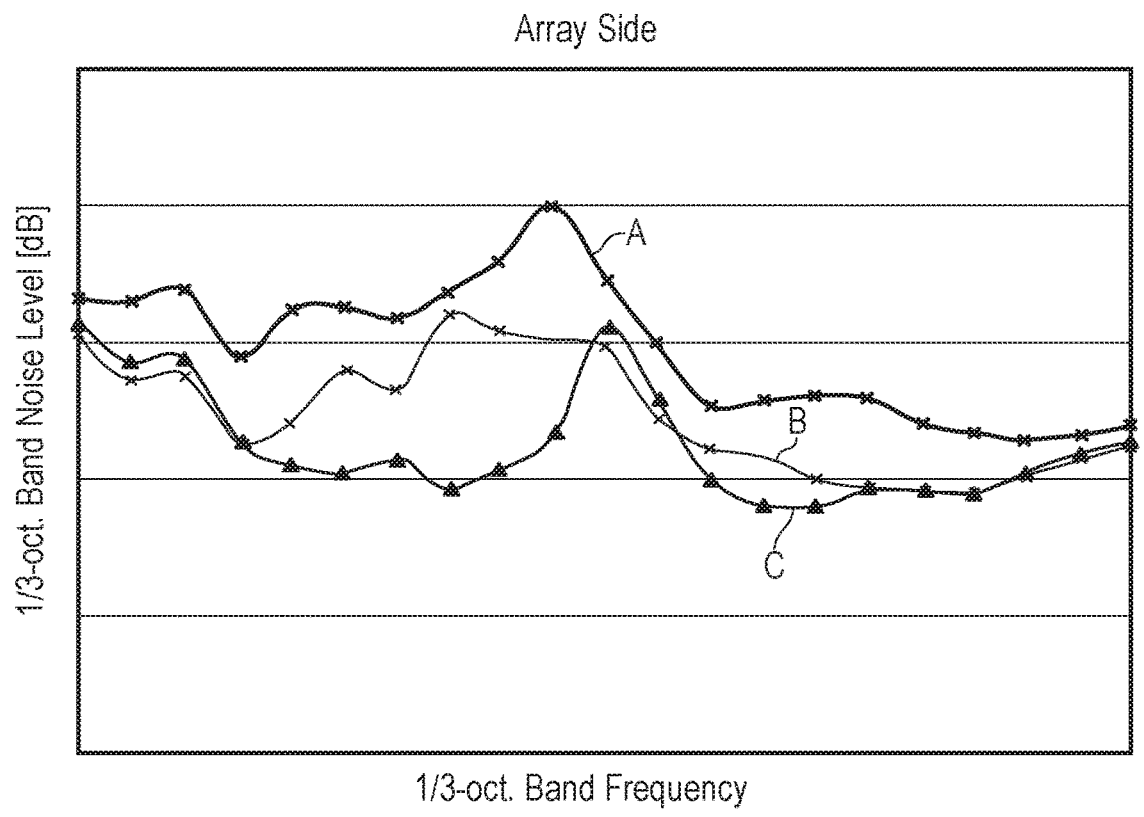
FIG. 22 and FIG. 23 depict diagrams of noise levels for comparison with prior art end rib assemblies.
Figure 23:
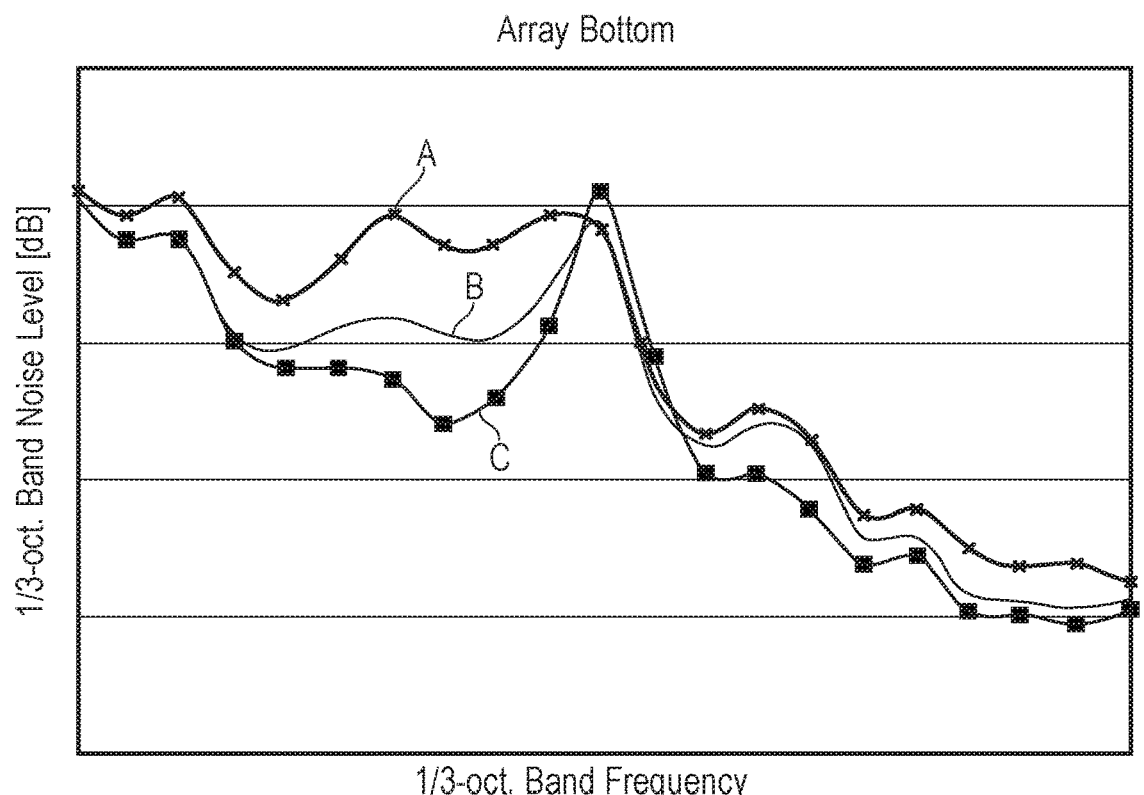

Reference is made now to FIGS. 22 and 23, which illustrate the noise level depending on the frequency for different embodiments of end rib assemblies. The noise level caused by an end rib assembly according to the prior art is designated A. The noise level of end rib assembly 10 is designated B whereas the noise level of the end rib assembly 76 is designated C.

As may be gathered from the diagrams, the end rib assemblies according to the disclosure herein substantially reduce the noise in the whole relevant frequency spectrum. Nearly noise generated and emitted towards the bottom of end rib assembly 10 is slightly increased around 2000 Hz.

As a result, the end rib assemblies as disclosed herein, cause substantially less noise during descent or approach. Thus, the overall noise of an aircraft equipped with these end rib assemblies may be reduced.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 end rib assembly
12 high-lift device
14 leading edge
16 trailing edge
18 guiding portion
20 noise-reducing portion
21 noise-reducing member
22 first point
24 lateral side edge
26 receiving opening
28 guiding channel
30 inlet opening
32 outlet opening
34 bearing arrangement
36 bearing members
38 sliding bearing members
40 sliding bearing surface
42 mounting portion
44 high-lift body
46 sealing portion
48 sealing strip 50 aircraft wing
52 wing longitudinal protrusion
54 catching portion
56 catching portion
58 inclined catching surface
60 upper catching portion
62 inclined catching surface
64 sound wave
66 receiving section
68 noise-reducing section
70 bearing arrangement
72 bearing member
74 roller bearing members
76 end rib assembly
78 leading edge
80 trailing edge
82 guiding portion
84 noise-reducing portion
86 metal-foam
88 end rib longitudinal protrusion
90 second point
92 guiding section
94 wing receiving opening
96 wing guiding channel
98 bearing arrangement
100 wing catching portions
102 lower catching portion
104 inclined catching surface
106 upper catching portion
108 inclined catching surface

The invention claimed is:

1. An end rib assembly for a high-lift device of an aircraft, the high-lift device being movably attachable to a wing of the aircraft, the end rib assembly being configured for reducing noise caused by a side edge of the high-lift device and by a gap between the wing and the high-lift device, the end rib assembly comprising:
a noise-reducing portion configured to reduce noise caused by an airflow around the end rib assembly; and
a guiding portion configured for guiding the end rib assembly along a predetermined path, when the high-lift device is moved between a retracted position and an extended position, wherein the guiding portion comprises a receiving opening, which is configured for receiving a wing longitudinal protrusion and is at a leading-edge side of the end-rib assembly, wherein the guiding portion comprises a guiding channel that extends away from the receiving opening, within the end rib assembly, to deliver an airflow from an outside of the end rib assembly to the noise-reducing portion at an end of the guiding channel, and wherein the airflow impinging on the guiding portion is partly guided towards the noise-reducing portion.

2. The end rib assembly according to claim 1, wherein the guiding portion is shaped at its leading edge such that the guiding portion is inclined towards a trailing edge, to partly guide the airflow impinging on the guiding portion towards the noise-reducing portion.

3. The end rib assembly according to claim 1, wherein the guiding portion is shaped at its leading edge such that the guiding portion is inclined towards a trailing edge such that the inclination smoothly and continuously transitions into the lateral edge, to partly guide the airflow impinging on the guiding portion towards the noise-reducing portion.

4. The end rib assembly according to claim 1, wherein the receiving opening is configured, in particular shaped, such that the wing longitudinal protrusion is received regardless of a deflection of the end rib assembly in a vertical direction.

5. The end rib assembly according to claim 1, wherein the guiding channel extends towards a trailing edge and is fluidly connected to the outside of the end rib assembly via the receiving opening, which is configured to take in the airflow impinging on the guiding portion.

6. The end rib assembly according to claim 5, wherein the guiding channel is configured to fluidly connect to the noise-reducing portion, to allow the airflow taken in by an inlet opening to flow to the noise-reducing portion.

7. The end rib assembly according to claim 5, wherein the guiding portion comprises an outlet opening at the end of the guiding channel that engages with the noise-reducing portion, to output an airflow taken in by an inlet opening into the noise-reducing portion.

8. The end rib assembly according to claim 5, wherein the guiding portion comprises a bearing arrangement for supporting the wing longitudinal protrusion, wherein the bearing arrangement is arranged within the guiding channel.

9. The end rib assembly according to claim 8, wherein the bearing arrangement comprises at least one bearing member, wherein the bearing member is selected from a group of bearing members consisting of roller bearing members and sliding bearing members.

10. The end rib assembly according to claim 1, wherein the guiding portion comprises an end rib longitudinal protrusion extending in a lateral direction outward, the longitudinal protrusion being configured to be received in a wing receiving opening, wherein the longitudinal protrusion does not extend beyond leading and trailing edges of the end rib assembly.

11. A high-lift device, in particular a flap, for an aircraft comprising a high-lift body configured to generate lift and an end rib assembly according to claim 1, wherein the end rib assembly is fixedly mounted to the high-lift body at a side edge.

12. An attachment arrangement for attaching a high-lift device to an aircraft wing of an aircraft comprising an end rib assembly and/or a high-lift device according to claim 1 and an attaching assembly, wherein the high-lift device is movably attached to the aircraft wing, wherein movement between the extended position and the retracted position is controlled by cooperation of the end rib assembly and the attaching assembly, and wherein the attaching assembly is matched to the end rib assembly.

13. The attachment arrangement according to claim 12, wherein the attaching assembly comprises the wing longitudinal protrusion configured for being received by the guiding portion and/or the attaching assembly comprises a wing guiding channel configured for receiving an end rib longitudinal protrusion.

14. The attachment arrangement according to claim 12, comprising a noise-reducing section having a noise-reducing material, wherein the noise-reducing section is mountable to a bottom side of an aircraft wing, to absorb noise emanating from the end rib assembly in an upward direction.

15. The end rib assembly according to claim 1, wherein the guiding portion comprises:
an outlet opening that engages with the noise-reducing portion; and
a bearing arrangement within the receiving opening and extending through the guiding channel towards a trailing edge of the end rib assembly, wherein the bearing arrangement is configured to support the wing longitudinal protrusion;

wherein the outlet opening is arranged at the end of the guiding channel that engages with the noise-reducing portion and is configured to output the airflow taken in by an inlet opening into the noise-reducing portion.

16. The end rib assembly according to claim 15, wherein the receiving opening is configured to receive the wing longitudinal protrusion regardless of a deflection of the end rib assembly in a vertical direction.

17. A high-lift device, in particular a flap, for an aircraft comprising a high-lift body configured to generate lift and an end rib assembly according to claim 15, wherein the end rib assembly is fixedly mounted to the high-lift body at a side edge.

18. An attachment arrangement for attaching a high-lift device to an aircraft wing of an aircraft comprising an end rib assembly and/or a high-lift device according to claim 15 and an attaching assembly, wherein the high-lift device is movably attached to the aircraft wing, wherein movement between the extended position and the retracted position is controlled by cooperation of the end rib assembly and the attaching assembly, wherein the attaching assembly is matched to the end rib assembly.

* * * * *